United States Patent [19]
Herman

[11] 3,848,338
[45] Nov. 19, 1974

[54] UNIVERSAL GAGE WITH TILT-OUT UPRIGHTS

[76] Inventor: Martin A. Herman, 2085 W. 114th St., Cleveland, Ohio 44102

[22] Filed: Dec. 20, 1972

[21] Appl. No.: 317,072

[52] U.S. Cl............................................. 33/174 PB
[51] Int. Cl. ............................................. G01b 5/20
[58] Field of Search ...... 33/174 PB, 174 PA, 174 P, 33/174 L, 147 N, 143 L, 178 E, 199 B, 149 RB, 178 D, 178 R

[56] References Cited
UNITED STATES PATENTS

| | | | |
|---|---|---|---|
| 1,630,299 | 5/1927 | Johnson | 33/174 R |
| 2,365,353 | 12/1944 | Morris | 33/174 L |
| 2,707,321 | 5/1955 | Breisch | 33/174 P |
| 2,775,039 | 12/1956 | Price | 33/174 PB |
| 3,125,811 | 3/1964 | Pierce et al. | 33/174 Q |
| 3,226,833 | 1/1966 | Lemelson | 33/143 L |
| 3,762,056 | 10/1973 | Wolfe | 33/174 PA |

Primary Examiner—Harry N. Haroian
Assistant Examiner—John W. Shepperd
Attorney, Agent, or Firm—Oldham & Oldham Co.

[57] ABSTRACT

A universal style gage is provided and includes a base and uprights carried thereby. Block means forming a part of the base at opposite ends thereof have the uprights secured thereto and such means have positioning shafts extending therefrom at right angles to the longitudinal axis of the uprights and journalled in the base whereby the uprights can be swung outwardly of the base away from each other to facilitate access to a test article positioned on the gage. Locking means engage the upright support means to lock the uprights in vertical operative positions.

6 Claims, 3 Drawing Figures

PATENTED NOV 19 1974
3,848,338
FIG.1
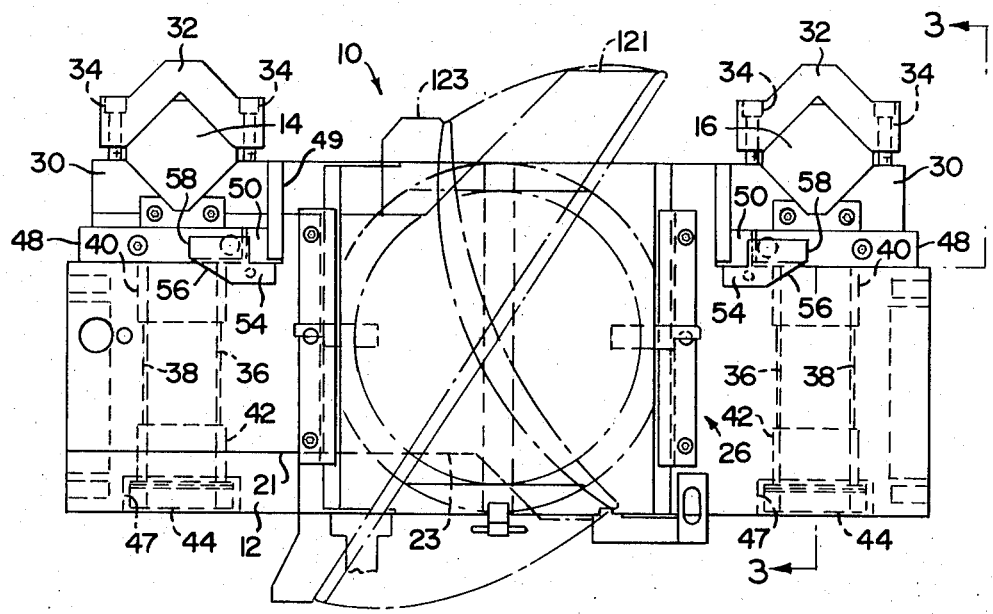
FIG.2
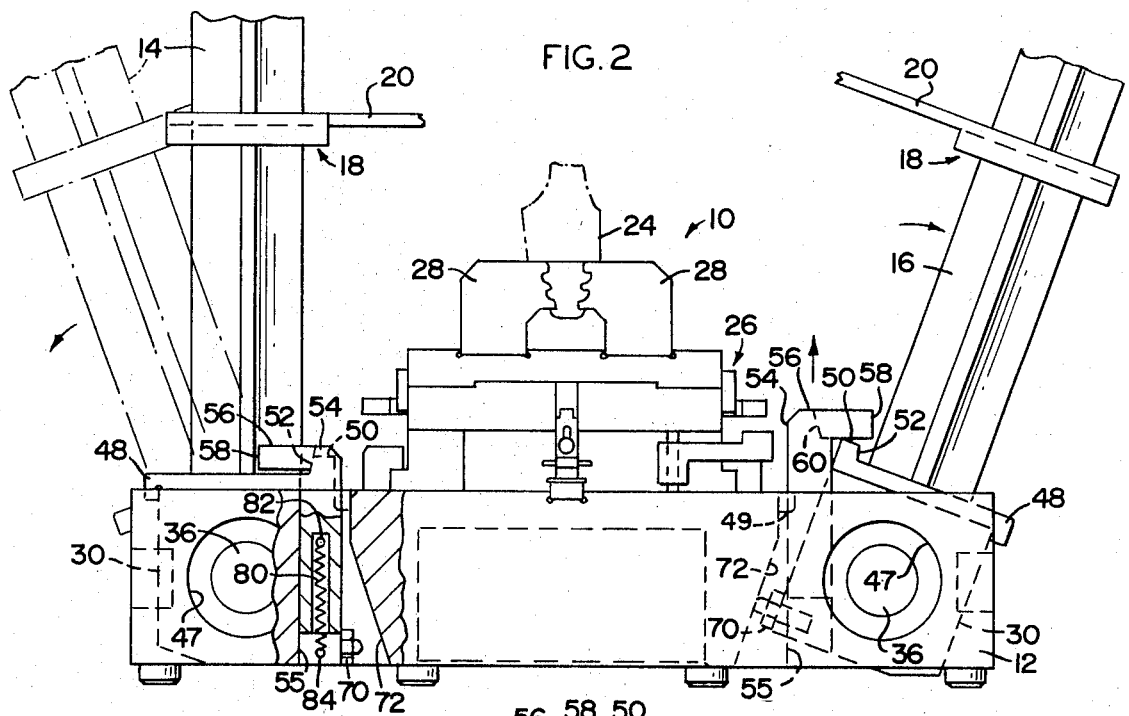
FIG.3

UNIVERSAL GAGE WITH TILT-OUT UPRIGHTS

This invention relates to universal style guillotine gages of the type shown in my prior U.S. Pat. No. 2,964,850. In these gages, a plurality of support cartridges are provided at vertically spaced portions of the vertical uprights in the gage and these cartridges slidably position gage plates therein for operative engagement with a test article supported on the gage. Frequently these test articles may be relatively wide and may have some appreciable curvature therein whereby the article is wider than the support cartridges for the gage plates. These gage plates may be of the so-called mushroom type wherein the operative article engaging or head portions of the gage plates are appreciably wider than the back portions of the plates which operatively engage the cartridges for positioning the same. Hence, it is quite difficult in many instances, or is a slow, time consuming job to get an article into and out of engagement with the gage plates and the gage means provided.

The general object of the present invention is to provide a novel and improved gage where uprights are specially positioned on a gage base means so that the uprights can be pivoted outwardly of the gage base in opposite directions to expose the center area of the gage means to facilitate article placement and removal in relation to the gage.

Another object of the invention is to provide a sturdy, accurate gage means wherein a pair of uprights are provided and are carried on the base by blocks having shaft means thereon positioned on horizontal axes, the shafts permitting arcuate swing-out movement of the uprights when desired.

Another object of the invention is to secure an upright on a gage base by positioning members which are adapted for arcuate movement in relation to the gage means.

A further object of the invention is to position a rotatable support shaft in a gage in a fixed or accurate manner and to permit release and arcuate movement of such support shaft and the means carried thereby readily when desired.

Another object of the invention is to facilitate the gaging of relatively large elongated articles having appreciable twist therein in a relatively small gage.

The foregoing and other objects and advantages of the invention will be made more apparent as the specification proceeds.

Reference now is made to the accompanying drawings, wherein:

FIG. 1 is a plan view of a gage embodying the principles of my invention;

FIG. 2 is a side elevation of the gage of FIG. 1, with some parts broken away and some parts shown in vertical section; and FIG. 3 is a fragmentary vertical section taken on line 3—3 of FIG. 1.

When referring to corresponding members shown in the drawings and referred to in the specification, correspondng numerals are used to facilitate comparison therebetween.

INVENTIVE SUBJECT MATTER

In this invention, a universal style gage of the type that includes a base, a pair of uprights, means to secure a test article to the base for positioning it between the uprights, cartridge means secured to the uprights at vertically spaced portions thereof, and guide plates slidably carried by the cartridge means and movable towards each other and a center portion of the gage is provided. The present invention comprises the addition or improvement to such gage or an equivalent device of a positioning member for each of the uprights engaged therewith and forming an operative portion of the base, a positioning shaft operatively secured to each of these members and extending therefrom perpendicularly to the longitudinal axis of the upright, and means journalling the shafts in the base on horizontal axes for pivotal movement of said members and uprights outwardly of the base and away from each other. Additional means are provided for locking the members to the base with the uprights vertically positioned so that operative and released positions can be provided for the uprights and the gage members carried thereby, the gage having a relatively open center portion in the upright inoperative, or released position.

Attention now is especially directed to the details of the structure shown in the drawings, and the gage 10 is provided, which gage is of the universal type and is a "guillotine" type gage. This gage 10 includes a base 12 and normally two uprights 14 and 16 are secured to the base adjacent each end thereof at one longitudinally extending side of the base. In this type of gage, a plurality of cartridge means 18 are adjustably secured to the uprights at vertically spaced portions thereof and extend laterally of the gage therefrom. A gage plate 20 is individually slidably carried by each of the cartridge means 18 for movement axially of the gage. These gage plates 20 as positioned on the different uprights 14 and 16 are slidably mounted on the cartridge means, as by positioning gibs or the like (not shown) engaging rear or axially outer ends of the gage plates 20 so that they can move or slide inwardly toward the center of the gage for engaging and/or checking a test article positioned in the gage.

A test article is indicated by the numeral 24 and normally this is an elongated article which has some appreciable twist therein and different contours at longitudinally spaced portions thereof.

The gage 10 may position any suitable type of mounting means or centering means 26 on the base and including a pair of jaws 23, 28 that are adapted to engage the lower end of the test article 24 to position it on the center line of the gage 10 in proper vertical relationship with the uprights 14 and 16 and/or gaging surfaces of the base 12. In other words, the test article 24 is suitably positioned in the gage 10 for gaging action thereon.

The drawings show that each of the uprights 14 or 16 is secured to an individual positioning member or block 30 which forms an operative portion of the base 12 and is received in an edge recess therein. The uprights are secured to the positioning members 30 as by V-shaped clamps 32 and cap screws 34 that extend through such clamp and engage the positioning members 30 for accurate positioning of the uprights. The positioning members 30 are provided with accurate associated support means as hereinafter described whereby the uprights 14 and 16 will be in desired relationship to gaging surfaces on the base 12 when the uprights are in their operative positions and usually this would be extending vertically upwardly from reference gage surfaces on the base 12.

The positioning member 30 has a support shaft 36 either operatively secured thereto or formed integrally therewith, as desired, and such shaft 36 is positioned in the gage 10 on a horizontal axis and it extends at right angles to the vertical axis of the upright with which it is associated. This shaft 36 is received in a bore 38 formed in the base 12 and extending thereacross. The shaft 36 can be positioned in an accurate manner on a fixed horizontal axis by any suitable means such as bushings 40 and 42. A lock nut 44 engages a threaded end section of the shaft 36 and is received in a counterbore 47 in a sidewall of the base to retain the shaft 36 and the upright positioning means in a fixed location and the shaft 36 cannot move axially.

The drawings indicate how the uprights 14 and 16 can be swung away from each other in opposite directions in relation to the base 12 to clear the center of the gage. An upper gage plate 21 that is positioned in one of the upper cartridge means on an upright and which has a head or operative end 121 appreciably wider than the slide portion or back end of the gage plate that slidably engages the cartridge means 18 is indicated in FIG. 1. Likewise, a lower gage plate 23 is also positioned in the gage and again, the head portion 123 thereof is wider than the slide mount means for such gage plate. Thus, the article being gaged can be appreciably wider than the gage, as indicated in FIG. 1 of the drawings, and the test article can have a changing contour or an axial twist provided therein. At the same time, by swinging the uprights 14 and 16 away from each other, the center of the gage is opened and the positioning of the test article in the gage or the removal of the article therefrom is greatly facilitated.

It is desirable that the uprights 14 and 16 be locked in their operative, vertical positions. Thus, a key 48 or equivalent member may be secured to or be provided on the positioning member 30 for the uprights. Such key 48 is shown extending parallel to the longitudinal axis of the base and it can be accurately positioned on this member 30 to terminate at the inner vertically extending edge thereof. The key has an upwardly extending shoulder 50 at its inner end with a tapered end surface 52 slanting slightly downwardly and axially outwardly of the gage base adjacent such shoulder. A locking action is then secured by a vertically slidable locking means or device 54 positioned in a slot 55 in the base for movement on a vertical axis. Such lock means 54 has a top flange 56 formed thereon which flange or finger has a laterally offset section 58, as shown in FIG. 1, provided thereon. Such lateral offset 58 has an axially inwardly vertically upwardly directed surface 60 provided thereon. The arrangement of the lock means 54 in relation to the key 48 is such that when the upright is vertically positioned, the lock means 54 can move vertically downwardly in its positioning slot 55 and the inclined surface 60 will slide into engagement with the inclined surface 52 on the shoulder 50 of the key whereby an effective, locked engagement is provided therebetween. However, when the upright is to be moved, the lock means 54 can be manually raised out of engagement with the key and pivotal movement of the upright is permitted.

So as to provide some limit for outward movement of the uprights, an adjustable stop 70 normally is provided on a lower inner end of the member 30. Such stop is adapted to engage an associated surface 72 that is one wall of the recess provided in the gage base 12 for receiving one of the individual positioning members 30 therein. A stop member 49 is secured to the base 12 to limit inward pivotal movement of the positioning member 30.

Preferably the lock means 54 is urged downwardly of the gage at all times and thus a return member, such as a spring 80, is carried by the lock means and positioned therein at one end as by a pin 82. The other end of the spring engages a cross pin or similar member 84 secured to the gage base whereby such spring 80 urges the lock means to its locked position under normal operating conditions.

From the foregoing, it is believed to be seen that a novel and improved gage has been provided that is especially adapted to position and test relatively large elongated articles having an appreciable amount of curvature therein and of a varied cross section at different axial portions thereof. Such test article can be accurately checked in a gage of relatively small dimensions. The gage has a center portion which can be made remarkably open for article positioning and removal purposes. At the same time, the gage is accurately constructed and will provide a long service life with a minimum of maintenance thereon. Any suitable gaging surfaces and reference points can be provided in the gage in any conventional manner.

While one complete embodiment of the invention has been disclosed herein, it will be appreciated that modification of this particular embodiment of the invention may be resorted to without departing from the scope of the invention.

What is claimed is:

1. In a universal type gage including a base, a pair of uprights, means for positioning a test article between said uprights, and gage means carried by said uprights, the improvement of a positioning means on the base for an upright and having one of said uprights secured thereto, a shaft operatively secured to and extending from said positioning means, means journalling said shaft on said base for pivotal movement of said one upright away from said base, means for locking said positioning means in position on said base with said one upright vertically positioned, and said locking means including a lock member slidable vertically in relation to said base, and a locking device provided on said positioning means, said lock member and locking device having operative engagement when said one upright is vertically positioned.

2. A gage as in claim 1 where a lock means engages said shaft to hold it against axial movement.

3. In a universal type gage including a base defining a base plane, a pair of uprights, means for securing a test article to the base and position it between said uprights, cartridge means secured to said uprights at vertically spaced portions thereof, and gage plates slidably carried by said cartridge means and with the gage plates on one upright being movable towards the gage plates on the other of said uprights, the improvement of a positioning member for each of said uprights forming an operative portion of the base, means securing an upright to each of said members, a shaft operatively engaging each of said members and extending therefrom perpendicularly to the longitudinal axis of the upright secured thereto, means journalling said shafts in said base on horizontal axes for pivotal movement of said members and uprights outwardly of said base and away from each other, means on said base to limit inward pivotal movement of said positioning members to position said uprights to extend vertically with relation to said base plane, and means for locking said members to said base only when said uprights are vertically positioned so that when said locking means are released said uprights can be swung away from each other.

4. A gage as in claim 3 where said locking means include a lock member slidable vertically in relation to said base, and a locking key carried on said member on an upper surface thereof, said lock member and locking key having a complementary shoulder means formed thereon for engaging when said upright is vertically positioned.

5. A gage as in claim 4 where spring means engage said lock member to urge it into engagement with said locking key.

6. A gage as in claim 3 where a stop means engages said base to limit pivotal outward movement of said uprights.

* * * * *